United States Patent [19]

Breiter

[11] 4,110,516

[45] Aug. 29, 1978

[54] SODIUM-SULFUR CELL CASING

[75] Inventor: Manfred W. Breiter, Schenectady, N.Y.

[73] Assignee: Electric Power Research Institute, Inc., Palo Alto, Calif.

[21] Appl. No.: 806,723

[22] Filed: Jun. 15, 1977

[51] Int. Cl.² .............................................. H01M 4/36
[52] U.S. Cl. ..................................... 429/104; 429/163
[58] Field of Search ................................ 429/101–104, 429/163, 176, 177; 204/26

[56] References Cited

U.S. PATENT DOCUMENTS

| 3,649,477 | 3/1972 | Bart | 204/26 |
| 3,751,344 | 8/1973 | Angelini | 204/26 X |
| 4,048,390 | 9/1977 | Chatterji | 429/102 |
| 4,048,391 | 9/1977 | Tilley et al. | 429/104 |

Primary Examiner—Charles F. LeFevour
Attorney, Agent, or Firm—Flehr, Hohbach, Test, Albritton & Herbert

[57] ABSTRACT

An improved hermetically sealed sodium-sulfur cell casing formed as a container of metal, the interior side wall of the container being characterized by an electrically conducting corrosion resistant electrolytically applied layer of material. Preferably the metal of the container comprises aluminum and the layer is chromium. A second embodiment includes a layer of electrolytically applied zinc to the aluminum and a layer of chromium electrolytically applied to the zinc layer.

4 Claims, 4 Drawing Figures

U.S. Patent  Aug. 29, 1978  4,110,516
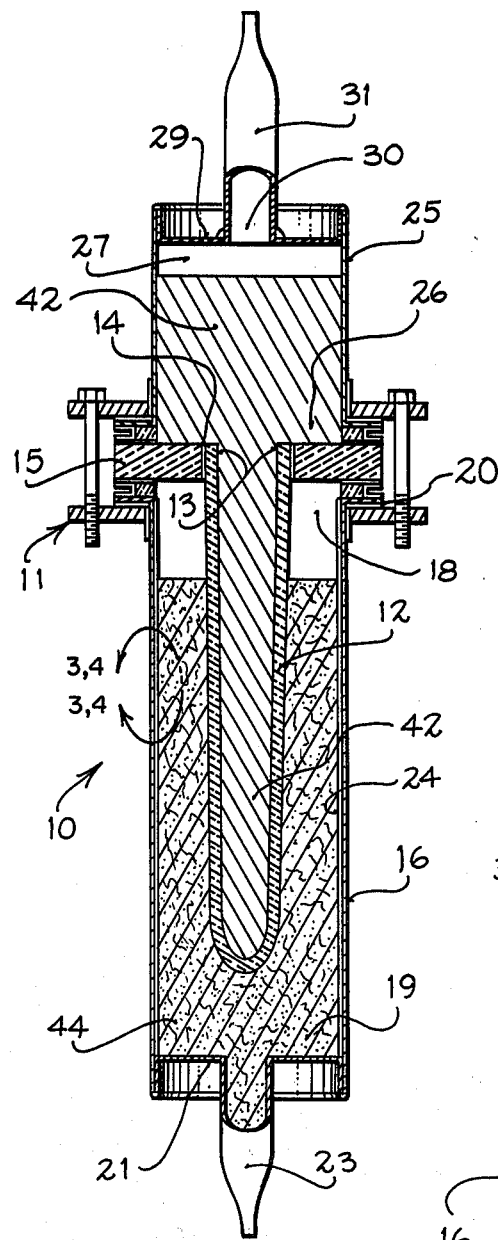
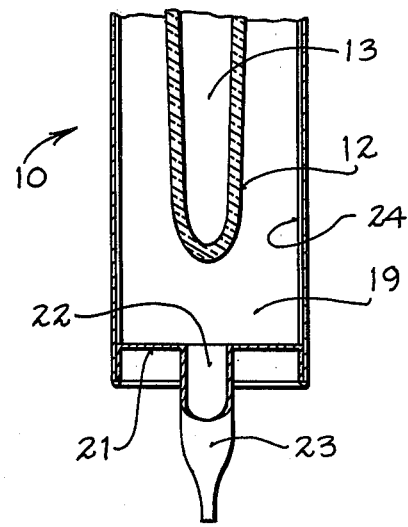
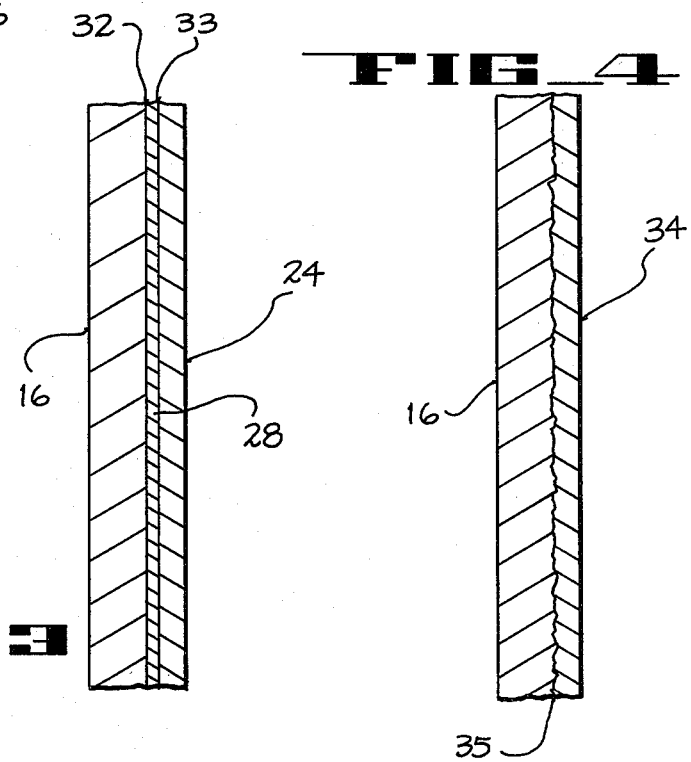

SODIUM-SULFUR CELL CASING

BACKGROUND OF THE INVENTION

This invention relates to improved cell casings and more particularly to a sealed cell casing for employment in hermetically sealed sodium-sulfur cells.

Sodium-sulfur cells, which operate at elevated temperatures, are known as heretofore disclosed in U.S. Pat. No. 3,404,036.

Cell structures of the kind described are typically exposed to severe corrosion tending to impair the effectiveness of the cell.

SUMMARY OF THE INVENTION AND OBJECTS

In general, there is provided an improved hermetically sealed sodium-sulfur cell casing or casing portion comprising a container or container portion of metal. The interior side wall of the container has been characterized by an electrically conducting corrosion resistant electrolytically applied layer of chromium.

In general, it is an object of the present invention to provide an improved corrosion resistant interior for a sodium-sulfur cell casing.

It is another object of the present invention to provide a corrosion resistant interior to a sodium-sulfur cell casing in a manner whereby the protective layer remains adhered to the inner side wall of the cell casing with improved adherence.

It is another object of the present invention to provide a method for applying a layer of electrically conducting corrosion resistant material to the inner side wall of the cell casing.

The foregoing and other objects of the invention will become more readily evident from the following detailed description of a preferred embodiment.

BRIEF DESCRIPTION OF THE DRAWINGS

FIG. 1 shows an elevation section view of a hermetically sealed sodium-sulfur cell casing according to the invention, shown with sodium present within casing 12;

FIG. 2 shows an enlarged detail portion of a sodium-sulfur cell casing according to the invention;

FIGS. 3 and 4 respectively show further enlarged section views of portions of the wall of a sodium-sulfur cell casing taken in the region 3—3 and 4—4 of FIG. 1 and as formed each of two methods.

DETAILED DESCRIPTION OF PREFERRED EMBODIMENTS

A sodium-sulfur cell 10 as shown in FIG. 1 is characterized by the hermetic seal assembly 11 of a type as shown and disclosed in my U.S. Pat. No. 3,959,013.

An inner casing 12 of a solid sodium ion conductive material formed with one open end 13 is sealed by means of a glass seal 14 to a ceramic ring 15.

A metallic cathode casing portion or container 16 of aluminum forms a tubular container with opposite open ends 18, 19 and a flange 20 at end 18 to surround inner casing 12 in spaced relation thereto. A removable closure 21 fits into the open end 19 of container 16 formed with a fill tube 23 secured to closure 21. Tube 23 forms a suitable flow passage connected to the interior of container 16. A metallic anode casing portion 25 of aluminum includes opposite end openings 26, 27. Portion 25 is secured to assembly 11 by means as described in the above identified patent. The upper end opening 27 is plugged by means of the removable closure 29 formed in a manner similar to closure 21 whereby a fill tube 31 is connected to a flow passage 30.

Sodium metal 42 disposed within casing 12 and casing 25 serves to form an anode. A positive electrode 44 of sulfur in an electrically conductive material is disposed within the (cathode casing) container 16 in contact with the outer wall of casing 12 and the inner wall of container 16.

Apparatus of the kind described provides highly corrosive conditions within container 16 and, accordingly, as disclosed in the above identified patent, a layer of corrosion resistant molybdenum or graphite plasma sprayed onto the inner side wall of container 16 has offered protection to container 16.

Reliance upon plasma spraying of material to provide a corrosion resistant protective layer on the interior of container 16 constitutes a significant expense. However, it has been observed that molybdenum does not lend itself to being applied by other less costly means and accordingly plasma spray techniques have been relied upon.

As shown in FIGS. 3 and 4, electrolytically deposited layers 24, 34 are shown as having been electrolytically applied to the interior of the metallic cell or container 16.

As shown in FIG. 3, container 16 has had applied thereto a zinc layer 28 achieved by immersion of the aluminum container 16 in alkaline zincate solution using an electroless process. This precoating of the aluminum interior by zinc layer 28 forms a basis to which chromium can be electrolytically deposited from an acidic chromate solution to form the chromium layer 24. While the foregoing procedure is satisfactory for most purposes, it is to be observed that this procedure provides two interfaces 32, 33 so that if weakness should develop at one or the other of the two interfaces, corrosion can set in to cause the layers 28, 24 to peel off.

Accordingly, an improved embodiment shown in FIG. 4 is provided in which the inner wall surface of container 16 is pre-etched to a limited degree and then a layer 34 of chromium is directly deposited onto the aluminum from an electrolytic bath using no applied current. Thus, the construction shown in FIG. 4 represents the process of etching followed by electrolytic chromium deposition from an aqueous acidified chromate solution. The interface 35 is shown as being slightly irregular to represent the pre-etching of the inner wall surface of container 16.

While the foregoing procedures for electrolytically coating the inner wall surfaces of casing 16 are preferred where the additional cost can be justified, chromium can also be applied by plasma spraying as noted. However, it has been observed that the protective coating of chromium achieved by electrolytic deposition is substantially as good as a plasma sprayed chromium protective surface.

What is claimed is:

1. In a sodium-sulfur cell assembly a hermetically sealed sulfur cell casing comprising a container of aluminum, the interior side wall of said container being pre-etched and characterized by an electrically conducting corrosion resistant electrolytically applied layer of chromium overlying the pre-etched aluminum wall.

2. In a sodium-sulfur cell assembly a hermetically sealed sulfur cell casing comprising a container of aluminum, the interior side wall of said container being characterized by an electrically conducting corrosion resistant electrolytically applied layer of chromium, and an intermediate precoating layer of electrically conducting and electrolytically applied zinc interposed between the chromium layer and the interior aluminum sidewall of said container for supporting the chromium layer from the intermediate layer of zinc.

3. In a sodium-sulfur cell construction having first and second containers co-axially disposed to hold bodies of first and second corrosive materials in spaced apart relation, one of said containers comprising a hermetically sealed sulfur cell casing, an end closure therein, a flow passage defined therethrough for charging said casing with a body of sulfur, said casing comprising a container of aluminum, the interior sidewall of said container being pre-etched and characterized by an electrically conducting corrosion resistant electrolytically applied layer of chromium overlying the pre-etched aluminum wall of said container.

4. In a sodium-sulfur cell construction having first and second containers co-axially disposed to hold bodies of first and second corrosive materials in spaced apart relation, one of said containers comprising a heremetically sealed sulfur cell casing, an end closure applied thereto, a flow passage defined therethrough for charging said casing with a body of sulfur, said casing comprising a container of aluminum, the interior sidewall of said container being characterized by an electrically conducting corrosion resistant electrolytically applied layer of chromium, and an intermediate precoating layer of electrically conducting and electrolytically applied zinc interposed between the chromium layer and the aluminum sidewall of said container for supporting the chromium layer from the intermediate layer of zinc.

* * * * *